Patented June 16, 1925.

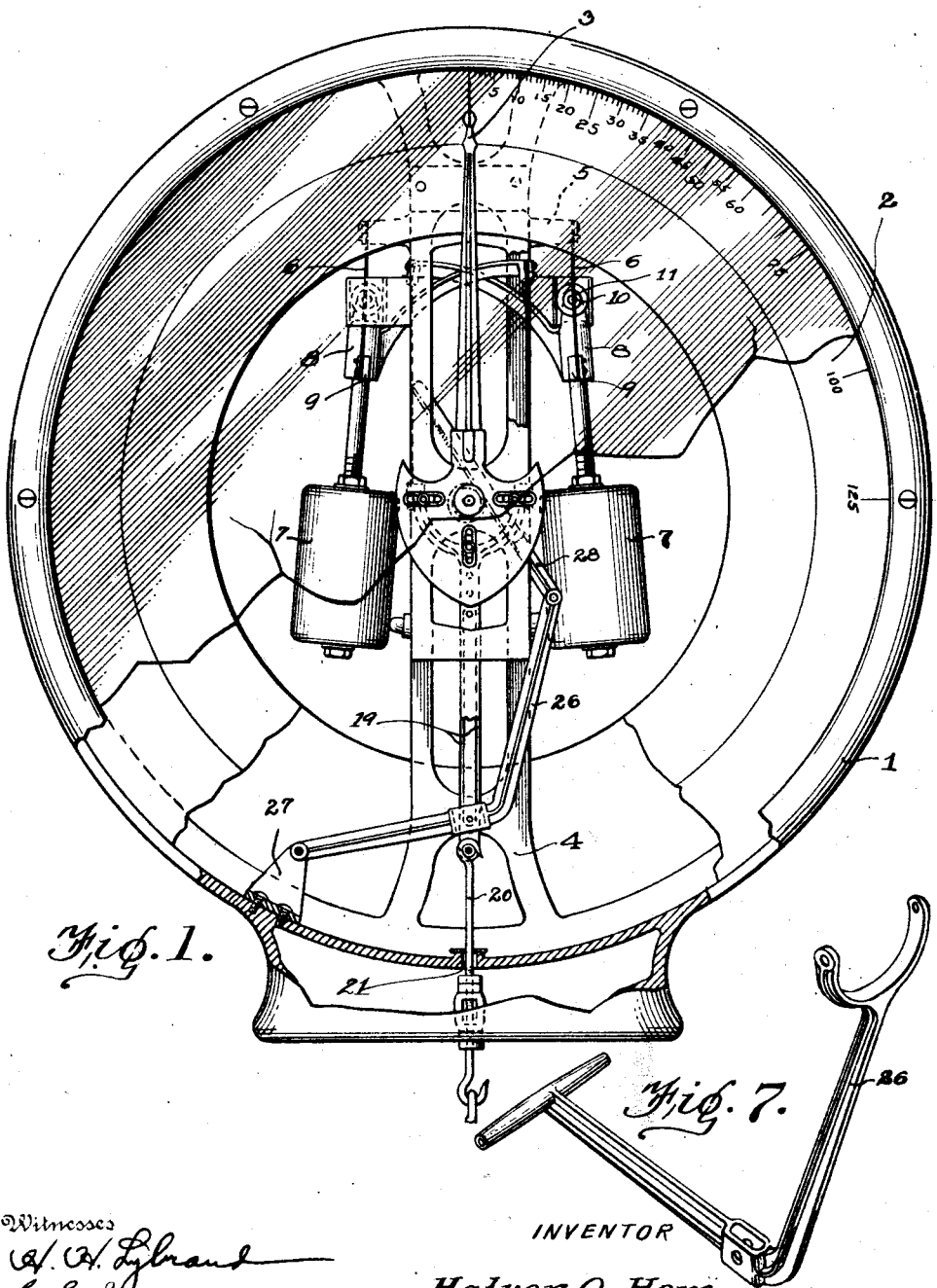

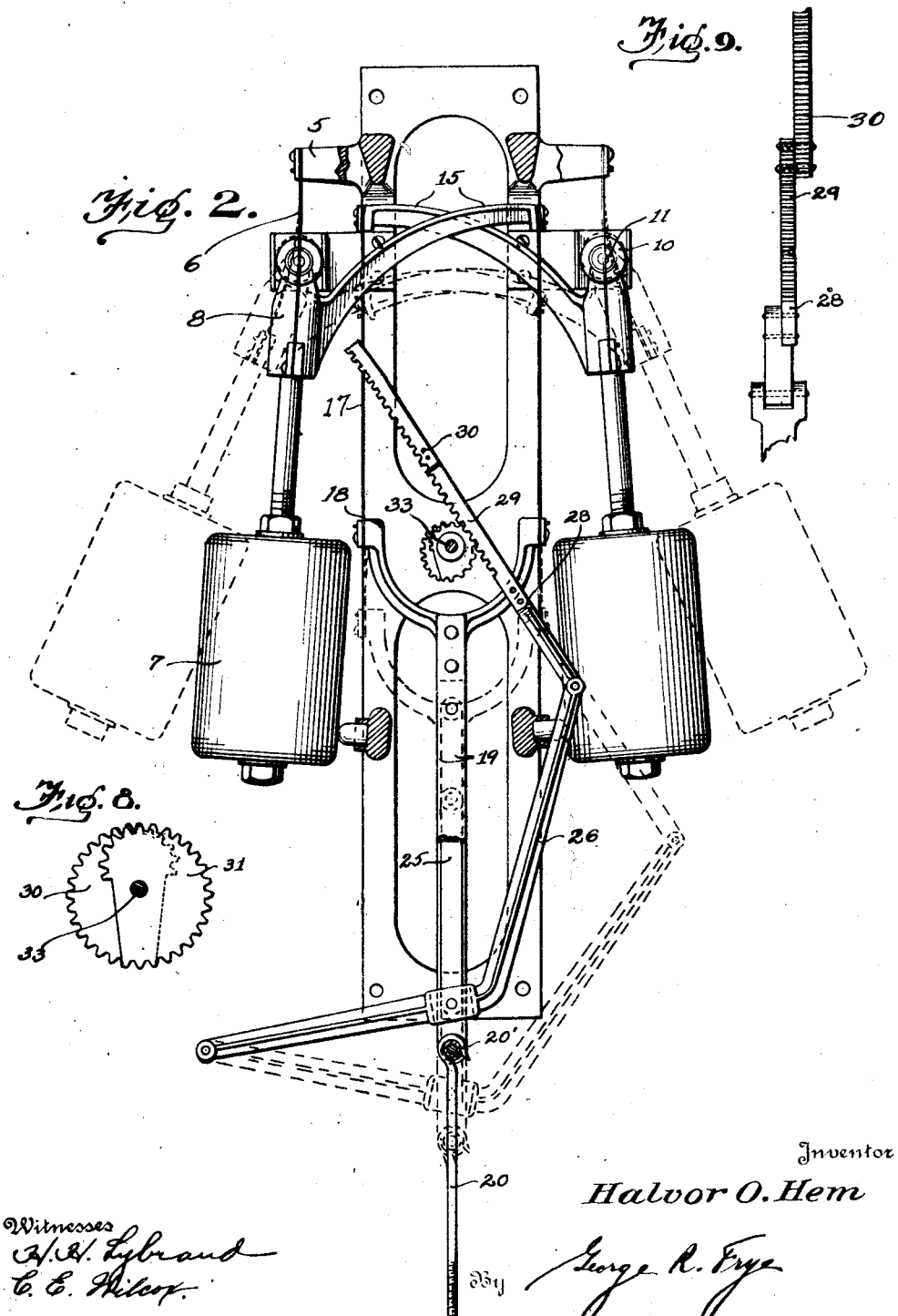

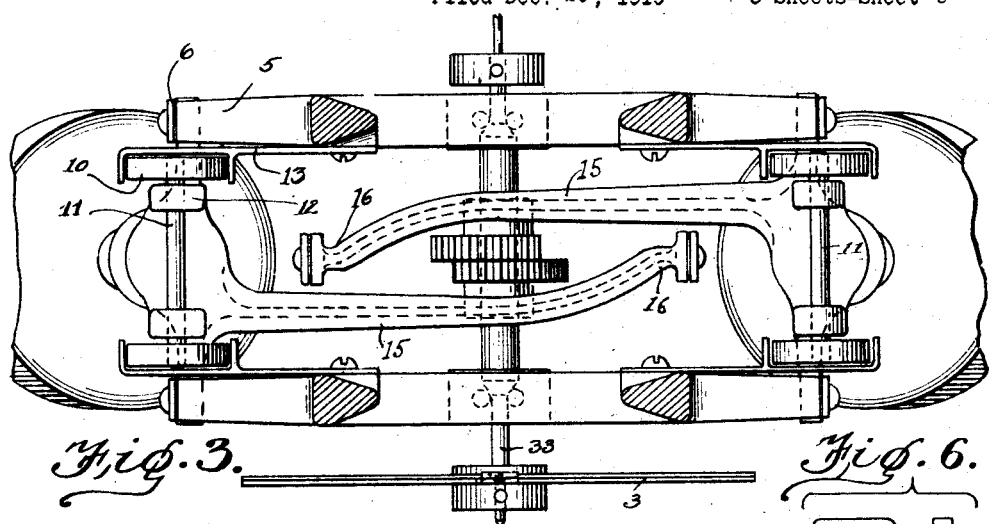

1,542,244

UNITED STATES PATENT OFFICE.

HALVOR O. HEM, OF TOLEDO, OHIO, ASSIGNOR TO TOLEDO SCALE COMPANY, OF TOLEDO, OHIO, A CORPORATION OF NEW JERSEY.

WEIGHING SCALE.

Application filed December 26, 1919. Serial No. 347,431.

*To all whom it may concern:*

Be it known that I, HALVOR O. HEM, a citizen of the United States, residing at Toledo, in the county of Lucas and State of Ohio, have invented certain new and useful Improvements in Weighing Scales, of which the following is a specification.

This invention relates to weighing scales of the type in which the load is offset or counterbalanced by swinging counterpoises or pendulums, and one of the objects thereof is to provide a scale in which the pendulums are so supported that the operation of the device is substantially frictionless.

Another object of the invention is to suspend the pendulums by means of steel bands or ribbons in such a way that no fulcrum sectors or guide frames are required, and to connect the pendulums to the platform lever mechanism by means of ribbons without using power sectors.

Another object of the invention is to provide a simple and efficient device for so connecting the load-offsetting mechanism to the indicator that movements of the load-offsetting mechanism to offset equal increments of weight will result in equal movements of the indicator so that the indicator may be used with a chart having uniform graduations.

Other objects and advantages will be apparent from the following description, in which reference is had to the accompanying drawings illustrating a preferred embodiment of my invention and wherein similar reference numerals designate similar parts throughout the several views.

In order to properly indicate the weights of various loads which may be placed upon the scale, the hand 3 must be capable of turning through slightly more than a complete revolution, and, since the rack 28 is engaged with two or more teeth of the pinion 30, it is evident that the spiral formed by each section of the pinion must extend through more than half a revolution. This is the reason for using a dual pinion with the sections in different planes and a rack bar having a section to co-operate with each section of the pinion.

In the drawings:—

Figure 1 is a front elevation of the head casing of a scale containing load-offsetting mechanism embodying my invention, part of the casing being broken away;

Figure 2 is an enlarged elevation of the load-offsetting mechanism shown in Figure 1 removed from the housing, part of the supporting frame being in section;

Figure 3 is a plan view on a still further enlarged scale of a portion of the load-offsetting mechanism, the supporting frame being partly in section;

Figure 4 is an enlarged side elevation of the upper portion of the mechanism shown in Figure 2;

Figure 5 is a side elevation of a link forming a part of the connection between the pendulums and the platform mechanism;

Figure 6 is a side and edge view of the pendulum supporting ribbons;

Figure 7 is a perspective view of an indicator operating arm;

Figure 8 is an elevation of a double spiral indicator operating pinion;

Figure 9 is an elevation of a rack for co-operating with the pinion shown in Figure 8.

I have shown a preferred embodiment of my invention as housed in a casing 1, one side of which displays a circular dial 2 adapted to co-operate with an indicator hand 3. It is to be understood, however, that the invention is equally adapted for use in scales having other forms of indicators and that I contemplate its use wherever applicable.

For the purpose of supporting the pendulum mechanism inside the casing 1 I employ a frame 4 suitably secured therein. Projecting from the upper portion of the frame 4 are four similar arms 5 to which are secured the upper ends of pendulum supporting ribbons 6. The ribbons 6 depend in pairs from the arms 5, and each pair of ribbons flexibly supports one of the pendulums 7. The upper end of each of the pendulums is in the form of a head 8 having a pair of arms 9 projecting therefrom, to which arms the lower ends of the ribbons 6 are secured.

For the purpose of preventing undue swinging movement of the pendulums when the scale is moved I have provided the pendulum heads with guide rollers 10. These rollers are mounted upon shafts 11 journalled in ears 12 which are formed upon the pendulum heads. Guides 13 for the rollers are secured to the frame 4. These guides are in the form of short vertical troughs, but it will be apparent from an inspection of the drawings that vertical movement of the rollers during weighing operations is practically nil and the scale will perform its weighing functions even though the guides be omitted.

The pendulums are provided with overlapping power arms 15 extending inwardly and upwardly therefrom. It will be noted by inspection of Figure 3 that the power arms lie outside the central planes of movement of the pendulums and that their free ends 16 are offset and thereby brought into the said planes of movement. This construction enables the power ribbons 17 which are secured to the ends of the power arms to be symmetrically placed with respect to the supporting ribbons 6 so that a pull upon the power ribbons does not tend to swing the pendulums out of their common plane of movement. The lower ends of the power ribbons 17 are connected to the bifurcated upper end 18 of the link 19, the lower end of which is connected to a hook rod 20 leading downwardly through an opening 21 in the casing 1 and connected by mesne connections to the platform lever mechanism (not shown) of the scale.

The body of the link 19 is made up of a pair of parallel side bars secured at their upper ends to the bifurcated member 18 and at their lower ends to a spool 20' which serves to space the parallel bars apart and at the same time forms an efficient connection with the hook rod 20. (See Figure 5.)

Pivotally mounted between the side bars of the link 19 is a depending link 25, the lower end of which is pivoted to an angle lever 26 (see Figures 2 and 5). One of the legs of the angle lever is substantially T-shaped and its other leg is substantially Y-shaped, as is clearly shown in Figure 7. The T-shaped end of the lever is pivoted to ears 27 secured upon the inner surface of the casing 1 and the Y-shaped end of the lever is pivotally connected to a similarly shaped end of a rack bar 28. The axes of the pivotal connections at the ends of the lever are thus of such length as to practically eliminate any tendency of either the lever 26 or the rack bar 28 to wabble during weighing movements of the scale, while the Y-shaped ends of the lever 26 and rack bar 28 form a loop that allows the parts to assume the positions in which they are shown in Figure 2 without any interference of the lever and rack bar with the pendulum. Wabbling of the rack bar would be particularly injurious in this construction for the reason that, as shown in Figure 9, the rack bar is of dual construction, comprising two rack sections 29 and 30 adapted to co-operate respectively with sections 31 and 32 of a dual spiral pinion which is fixed on a rotatably mounted shaft 33 carrying the indicator hand 3.

In the operation of the device, when a load is placed upon the scale the hook rod 20, link 19 and power ribbons 17 are pulled downwardly, thereby swinging the power arms 15 downwardly and causing the pendulums 7 to swing outwardly, as shown in dotted lines in Figure 2. As the pendulum bobs swing outwardly the effective length of the lever arms upon which they are supported increases until the resistance offered by the weight of the pendulum bobs equals the pull upon the ribbons 17. The load on the scale is then counterbalanced and the scale comes to rest. In order to prevent sharp bending and consequently liability to rupture of the ribbons 17 where they are secured to the power arms 15, the ribbons are thickened, as shown in Figure 6, so that when the arms 15 are pulled downwardly the ribbons are flexed, as shown in dotted lines in Figure 2.

When the link 19 is pulled downwardly the angle lever 26 swings about its fixed pivot, the link 25 allowing it to so move without distorting the plumb connection from the ribbons 16 to the platform lever mechanism, and as the lever 26 moves downwardly it draws the dual rack bar 28 over the dual pinion and rotates the shaft 33, thereby moving the indicator hand 3 over the dial 2. The resistance offered by each of the pendulums as it swings upwardly is not arithmetically progressive, but varies with the sine of the angle formed by a vertical line and the line passing through the center of mass of the pendulum and its pivot. Moreover, the effective force exerted upon each of the power arms 15 varies with the sine of the angle at the intersection with a vertical line of a line joining the point of application of the force and the pendulum pivot. It is evident, therefore, that if movement of the weighing mechanism were transmitted in constant ratio to the indicator hand, the addition of equal increments of load would result in unequal movements of the hand. The pitch line of the teeth of each section of the dual pinion is therefore given the form of a logarithmic spiral, but by the interposition of this pinion, movement of the indicator hand relatively to the increase of load on the scale is so retarded as relative movement of the load-offsetting mechanism accelerates, and vice versa, that movements of the indicator hand are directly proportional to the causative increases and decreases of load throughout the capacity of the scale. The indicating mechanism is therefore adapted for use with a chart having uniformly spaced graduations.

While it will be apparent that the illustrated embodiment of my invention herein disclosed is well calculated to adequately fulfill the objects primarily stated, it is to be understood that the invention is susceptible to variation, modification and change within the spirit and scope of the subjoined claims.

Having described my invention, I claim:

1. In a scale, in combination, a frame, a pendulum comprising a connected head and bob, a flexible supporting member having non-winding connections with said head and said frame, and a guide for preventing undue swinging of said head.

2. In a scale, in combination, a pendulum comprising a connected head and bob, a flexible supporting member having a non-winding connection with said head, a guide for preventing undue swinging of said head, and a roller on said head co-operating with said guide.

3. In a scale, load-offsetting mechanism comprising, in combination, a pair of oppositely-swinging pendulums, flexible supporting members having non-winding connection with said pendulums, and flexible power members having non-winding fixed connections with said pendulums.

4. In a scale, in combination, load-offsetting mechanism comprising a pair of pendulums, flexible supporting members each having a non-winding connection with one of said pendulums, said pendulums having overlapping power arms, and flexible power members depending from said arms.

5. In a scale, in combination, a frame, flexible supporting members secured to said frame, pendulums suspended by said flexible supporting members, the points of engagement between said supporting members and said pendulums being fixed with respect to said pendulums, guides on said frame, and projections on said pendulums co-operating with said guides.

6. In a scale, in combination, a frame, flexible supporting members secured to said frame, pendulums suspended by said flexible supporting members, the points of engagement between said supporting members and said pendulums being fixed with respect to said pendulums, guides on said frame, projections on said pendulums co-operating with said guides, overlapping power arms on said pendulums, and flexible power members fixed to said power arms.

7. In a scale, in combination, load-offsetting mechanism, a rack connected to said load-offsetting mechanism, a dual spiral pinion meshing with said rack, and indicating mechanism connected to said pinion.

8. In a scale, in combination, load-offsetting mechanism, a dual rack connected to said load-offsetting mechanism, a dual spiral pinion meshing with said rack, and indicating mechanism connected to said pinion.

9. In a scale, in combination, load-offsetting mechanism, a member connected thereto and having substantially rectilinear movement, indicating mechanism, a lever connected to said indicating mechanism, and a link connecting said member and said lever.

10. In a scale, in combination, load-offsetting mechanism, a slotted member connected thereto and having substantially rectilinear movement, indicating mechanism, a lever connected to said indicating mechanism and passing through said slotted member, and a link connecting said slotted member and said lever.

11. In a scale, in combination, load-offsetting mechanism, a slotted member connected thereto and having substantially rectilinear movement, indicating mechanism, a lever connected to said indicating mechanism and passing through said slotted member, and a link connecting said slotted member and said lever, said link lying in the slot.

12. In a scale, in combination, load-offsetting mechanism including a pendulum, a lever, said lever and pendulum swinging in coincident planes, and a rack bar pivoted to said lever on an axis passing through the pendulum in one position of the parts, the ends of said lever and said rack bar being bifurcated to avoid interference with said pendulum.

HALVOR O. HEM.

Witnesses:
C. O. MARSHALL,
FRANCES DOYLE.